(12) United States Patent
Zhu et al.

(10) Patent No.: US 9,401,594 B2
(45) Date of Patent: Jul. 26, 2016

(54) SURGE PROTECTION FOR DIFFERENTIAL INPUT/OUTPUT INTERFACES

(75) Inventors: Quanqing Zhu, Shanghai (CN); Guangming Yin, Newport Coast, CA (US)

(73) Assignee: QUALCOMM Incorporated, San Diego, CA (US)

( * ) Notice: Subject to any disclaimer, the term of this patent is extended or adjusted under 35 U.S.C. 154(b) by 235 days.

(21) Appl. No.: 14/374,498

(22) PCT Filed: Feb. 15, 2012

(86) PCT No.: PCT/CN2012/071166
§ 371 (c)(1),
(2), (4) Date: Jul. 24, 2014

(87) PCT Pub. No.: WO2013/120259
PCT Pub. Date: Aug. 22, 2013

(65) Prior Publication Data
US 2015/0194802 A1 Jul. 9, 2015

(51) Int. Cl.
*H02H 9/00* (2006.01)
*H02H 3/22* (2006.01)
*H04L 25/02* (2006.01)
(52) U.S. Cl.
CPC ............... *H02H 3/22* (2013.01); *H04L 25/028* (2013.01); *H04L 25/0272* (2013.01)
(58) Field of Classification Search
CPC ........................................................ H02H 3/22
USPC .......................................................... 361/111
See application file for complete search history.

(56) References Cited

U.S. PATENT DOCUMENTS 5,043,675 A * 8/1991 Gilbert ................ H03F 3/45479
330/258
5,917,689 A 6/1999 English et al.
(Continued)

FOREIGN PATENT DOCUMENTS

CN 101483339 A 7/2009
EP 2293403 A1 3/2011
(Continued)

OTHER PUBLICATIONS

Hsiao Y-W., et al., "ESD protection design for Giga-Hz high-speed I/O interfaces in a 130-nm CMOS process", SOC Conference, IEEE, Sep. 26, 2007, pp. 277-280, XP031274174, ISBN: 978-1-4244-1592-2.

(Continued)

*Primary Examiner* — Stephen W Jackson
(74) *Attorney, Agent, or Firm* — Paradice and Li LLP (57) ABSTRACT

An integrated circuit device (200) includes a first and second differential I/O pins (TRXP/TRXN) and a surge protection circuit. The surge protection circuit includes a protection transistor, a positive surge detection circuit, and a negative surge detection circuit. The protection transistor is connected between the first and second I/O pins and has a gate to receive a control signal (CTRL). The protection transistor is turned on to connect the I/O pins together if the positive surge detection circuit detects a positive surge energy on either of the I/O pins and/or if the negative surge detection circuit detects a negative surge energy on either of the I/O pins. The surge protection circuit provides increased protection for Ethernet device against undesirable energy in a manner that does not adversely affect the performance of the device.

23 Claims, 8 Drawing Sheets

(56) References Cited

U.S. PATENT DOCUMENTS

| | | | | |
|---|---|---|---|---|
| 6,400,541 | B1 * | 6/2002 | Brett | H01L 27/0255 330/207 P |
| 6,549,389 | B2 * | 4/2003 | Anthony | H01C 1/06 361/111 |
| 7,271,968 | B2 * | 9/2007 | Jang | G11B 5/40 360/46 |
| 7,965,104 | B2 * | 6/2011 | Ishibashi | H04L 25/0298 326/30 |
| 8,680,939 | B2 * | 3/2014 | Trautman | H04B 3/14 333/28 R |
| 8,848,321 | B2 * | 9/2014 | Halberstadt | H02M 3/155 361/18 |
| 9,001,926 | B2 * | 4/2015 | Shad | H04B 3/542 375/257 |
| 2008/0062600 | A1 | 3/2008 | Crawley et al. | |
| 2009/0040668 | A1 | 2/2009 | Chen et al. | |
| 2009/0296293 | A1 | 12/2009 | Ker et al. | |

FOREIGN PATENT DOCUMENTS

| | | |
|---|---|---|
| JP | 2004112891 A | 4/2004 |
| JP | 2004515923 A | 5/2004 |

OTHER PUBLICATIONS

Supplementary European Search Report—EP12868467—Search Authority—Munich—Oct. 12, 2015.

International Search Report and Written Opinion—PCT/CN2012/071166—ISA/EPO—Nov. 22, 2012.

* cited by examiner

SURGE PROTECTION FOR DIFFERENTIAL INPUT/OUTPUT INTERFACES

TECHNICAL FIELD

The present embodiments relate generally to integrated circuits and specifically relate to improved surge protection.

BACKGROUND

Figure 1:
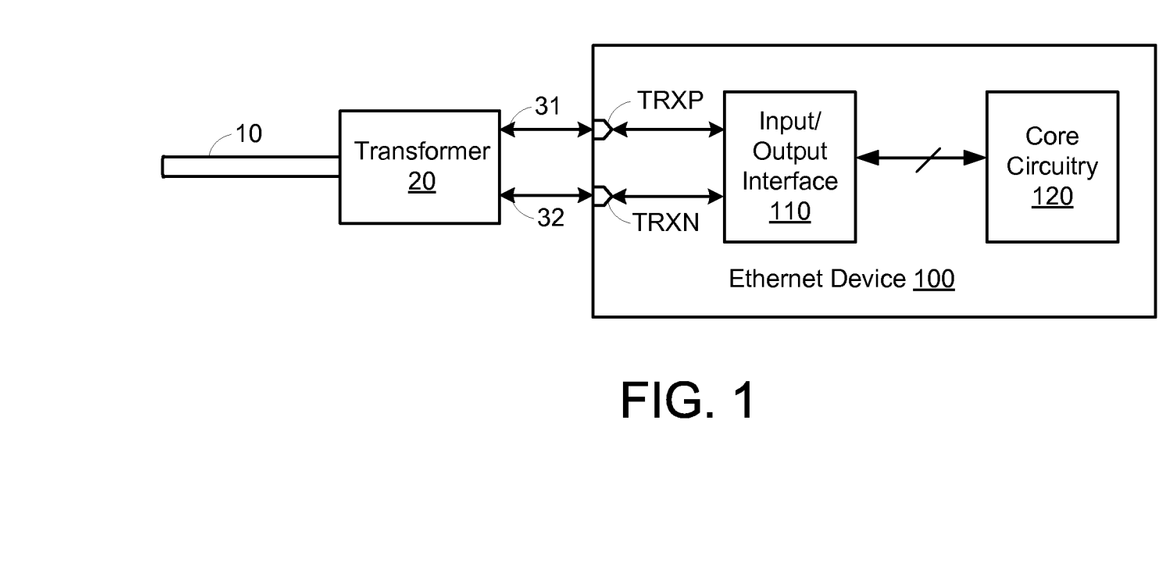
FIG. 1 is a block diagram of an Ethernet device connected to a communication medium via a transformer.

Ethernet devices having differential input/output (I/O) pins are typically connected to a communication medium (e.g., twisted-pair cables) through one or more transformers that provide some level of protection against undesirable voltage surges and/or electrostatic discharge (ESD) events. For example, FIG. 1 shows an Ethernet device 100 having an I/O interface 110, core circuitry 120, and a pair of differential I/O pins TRXP and TRXN. The I/O interface 110, which is typically an analog full-duplex interface, facilitates the exchange of signals between I/O pins TRXP/TRXN and core circuitry 120. The differential I/O pins TRXP/TRXN are connected via differential signal lines 31-32 to a transformer 20, which in turn is connected to a communication cable 10 (e.g., a twisted pair cable). In addition to transforming the voltages of signals provided on cable 10 to voltages more suitable for use by device 100, transformer 20 may protect circuitry within device 100 against surge energy emanating from cable 10.

More specifically, the surge energy emanating from cable 10 may be as high as several thousand volts, with cable 10 typically having a low output impedance (e.g., tens of ohms). Although some of this surge energy may be blocked by transformer 20, remnants of this surge energy are typically transferred to device 100 in the form of undesirable common-mode surges and undesirable differential mode surges. Common-mode surges typically refer to energy surges that elevate voltage levels on both differential I/O pins TRXP/TRXN at the same time, while differential mode surges typically refer to energy surges that elevate the voltage difference between the differential I/O pins TRXP/TRXN.

Industry standards typically specify Ethernet device 100 to have about 5 kV of common-mode surge tolerance. While transformer 20 is effective in blocking most of the common-mode energy surges, transformer 20 is less able to block the differential mode energy surges. Thus, it is usually much harder to protect device 100 from differential mode energy surges than from common-mode energy surges. Indeed, because the transformer 20 is typically designed to block common-mode signals and to pass differential signals, transformer 20 typically provides very limited protection against differential mode energy surges.

Thus, it would be desirable to provide increased protection for Ethernet devices against undesirable energy surges in a manner that does not adversely affect performance of the device.

BRIEF DESCRIPTION OF DRAWINGS

The present embodiments are illustrated by way of example, and not by way of limitation, in the figures of the accompanying drawings and in which like reference numerals refer to similar elements and in which.

DETAILED DESCRIPTION

A method and apparatus for protecting an input/output (I/O) interface and circuitry within an associated integrated circuit device against common-mode and differential mode energy surges are disclosed. In the following description, numerous specific details are set forth such as examples of specific components, circuits, and processes to provide a thorough understanding of the present disclosure. Also, in the following description and for purposes of explanation, specific nomenclature is set forth to provide a thorough understanding of the present embodiments. However, it will be apparent to one skilled in the art that these specific details may not be required to practice the present embodiments. In other instances, well-known circuits and devices are shown in block diagram form to avoid obscuring the present disclosure. The term "coupled" as used herein means connected directly to or connected through one or more intervening components or circuits.

Any of the signals provided over various buses described herein may be time-multiplexed with other signals and provided over one or more common buses. Additionally, the interconnection between circuit elements or software blocks may be shown as buses or as single signal lines. Each of the buses may alternatively be a single signal line, and each of the single signal lines may alternatively be buses, and a single line or bus might represent any one or more of a myriad of physical or logical mechanisms for communication between components. Further, the logic levels assigned to various signals in the description below are arbitrary, and therefore may be modified (e.g., reversed polarity) as desired. As another example, circuits described or depicted as including metal oxide semiconductor (MOS) transistors may alternatively be implemented using bipolar transistors or any other technology in which a signal-controlled current flow may be achieved. The present embodiments are not to be construed as limited to specific examples described herein but rather includes within its scope all embodiments defined by the appended claims.

In accordance with the present embodiments, an integrated circuit device is disclosed that includes first and second differential I/O pins and a surge protection circuit. The surge protection circuit includes a protection transistor, and a control circuit including a positive surge detection circuit and a negative surge detection circuit. The protection transistor is connected between the first and second differential I/O pins, and has a gate to receive a control signal generated by the control circuit. The positive surge detection circuit has a first input coupled to a first supply voltage (VDD1), a second input coupled to a second supply voltage (VDD2) that is greater than the first supply voltage, and an output. The negative surge detection circuit has a first input coupled to ground potential (VSS), a second input coupled to the differential I/O pins, and an output. The outputs of the positive and negative surge detection circuits are coupled to combinational logic gate that generates the control signal.

In operation, the positive surge detection circuit compares the voltage levels of VDD1 and VDD2 to detect whether a positive energy surge is present at either of the differential I/O pins, and the negative surge detection circuit compares the voltage levels of VSS and the I/O pins to detect whether a negative energy surge is present at either of the I/O pins. If a positive energy surge and/or a negative energy surge is detected, the control circuit turns on the protection transistor to connect the differential I/O pins together so that any such energy surges on one I/O pin are dissipated by the other I/O pin (e.g., rather than undesirably altering the intended operating voltage level of one or more of the supply voltages).

Figure 2:
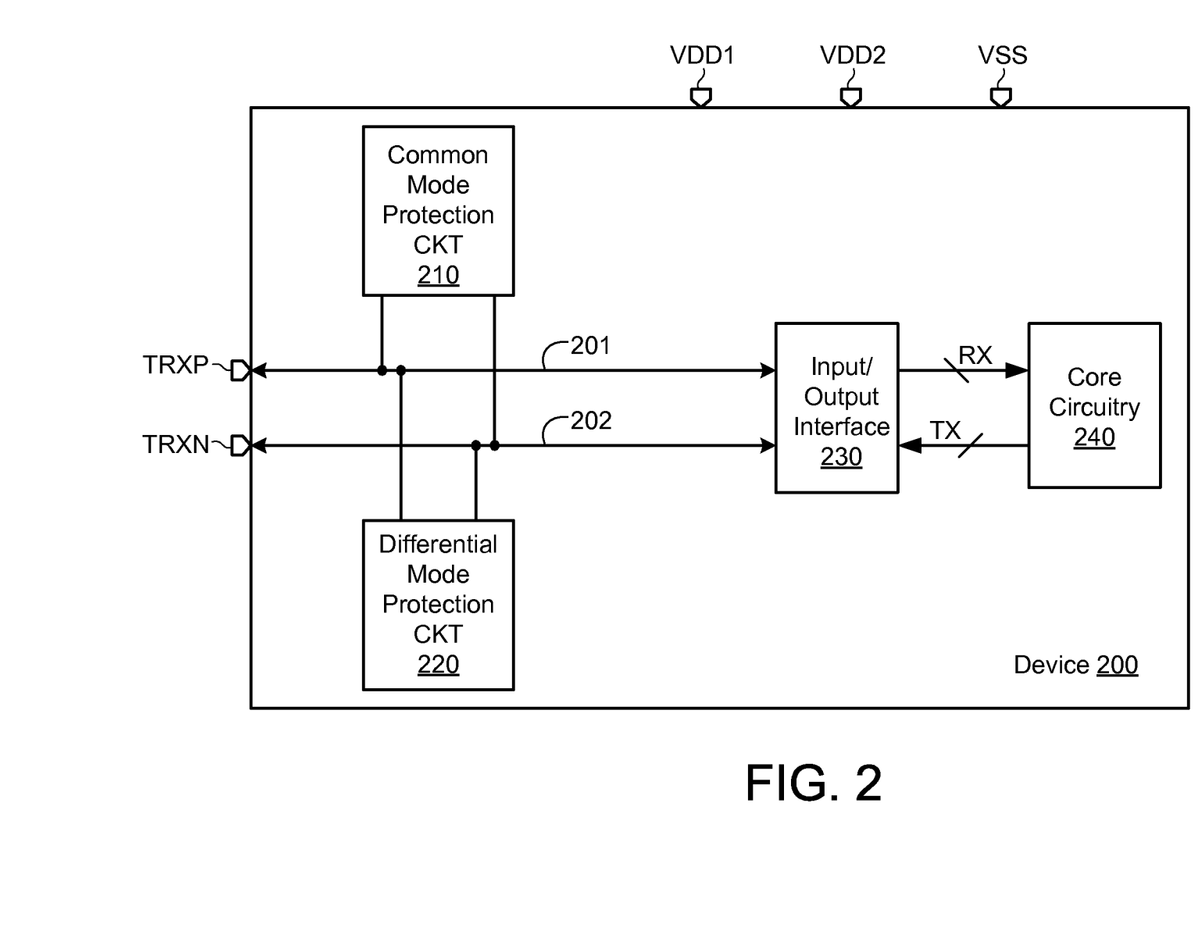
FIG. 2 is a block diagram of an integrated circuit device having common-mode and differential mode protection circuits in accordance with the present embodiments.

FIG. 2 is a block diagram of a device 200 having common-mode and differential mode protection circuits in accordance with the present embodiments. Device 200 is shown to include a common-mode surge protection circuit 210, a differential mode surge protection circuit 220, an I/O interface 230, core circuitry 240, a pair of differential I/O pins TRXP and TRXN, a first power pin connected to a first supply voltage VDD1, a second power pin connected to a second supply voltage VDD2, and a ground pin connected to VSS (e.g., ground potential). For the exemplary embodiments described herein, the first supply voltage VDD1 is a relatively low supply voltage, and the second supply voltage VDD2 is a relatively high supply voltage (e.g., where the normal operating voltage level of VDD2 is greater than the normal operating voltage level of VDD1). For some embodiments, VDD1 is a 2.5 volt supply voltage, and VDD2 is a 3.3 volt supply voltage, although other suitable supply voltages may be used for device 200. Further, although only one pair of differential I/O pins are shown in FIG. 2 for simplicity, it is to be understood that actual embodiments may include any suitable number of pairs of differential I/O pins.

The I/O interface 230, which for some embodiments may be a well-known analog full-duplex interface, facilitates the exchange of signals between I/O pins TRXP/TRXN and core circuitry 240. The differential I/O pins TRXP/TRXN are connected to I/O interface 230 via differential signal lines 201-202. Although not shown for simplicity, the I/O pins TRXP/TRXN may be connected to an external communication medium (e.g., a twisted pair cable or other Ethernet-compliant signal lines) via a suitable transformer (such as transformer 20 of FIG. 1).

The common-mode protection circuit 210 includes a first terminal connected to the TRXP pin, a second terminal connected to the TRXN pin, a power pin (not shown for simplicity) coupled to VDD1, and a ground pin (not shown for simplicity) coupled to VSS. Similarly, the differential mode protection circuit 220 includes a first terminal connected to the TRXP pin, a second terminal connected to the TRXN pin, a power pin (not shown for simplicity) coupled to VDD1, and a ground pin (not shown for simplicity) coupled to VSS. It is noted that although the terminals of protection circuits 210 and 220 are depicted in FIG. 2 as being electrically connected to signal lines 201-202 for simplicity, for actual embodiments, the terminals of protection circuits 210 and 220 may be connected directly to I/O pins TRXP and TRXN. As described in more detail below, the common-mode protection circuit 210 protects device 200 against common-mode energy surges appearing at I/O pins TRXP and TRXN, and the differential mode protection circuit 220 protects device 200 against differential mode energy surges appearing at I/O pins TRXP and TRXN. By utilizing an energy surge protection circuit that includes different circuits 210 and 220 configured to separately dissipate common-mode surges and differential mode surges, respectively, the present embodiments may provide more effective surge protection than prior techniques that use common circuitry to detect and/or dissipate common-mode surges and differential mode surges.

Figure 3:
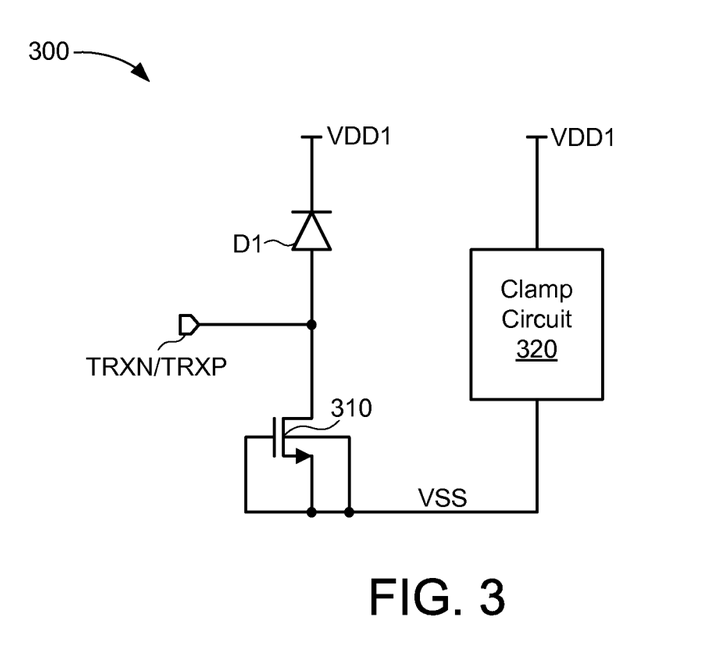
FIG. 3 is a block diagram of the common mode protection circuit of FIG. 2 in accordance with some embodiments.

FIG. 3 is a simplified circuit diagram of a common-mode protection circuit 300 that is one embodiment of the common-mode protection circuit 210 of FIG. 2. Common-mode protection circuit 300 includes a diode D1, a grounded-gate NMOS (GGNMOS) transistor 310, and a clamp circuit 320. Diode D1, which may be implemented in a well-known manner (e.g., using MOS or bipolar devices), is coupled between VDD1 and I/O pin TRXN/TRXP. Grounded-gate NMOS transistor 310 is coupled between I/O pin TRXN/TRXP and VSS, and has a gate connected to VSS. Clamp circuit 320, which may be any suitable voltage clamp circuit (e.g., an active diode clamp circuit), is coupled between VDD1 and VSS. In operation, diode D1 and clamp circuit 320 protect device 200 against positive common-mode energy surges, and NMOS transistor 310 protects device 200 against both positive and negative common-mode energy surges. More specifically, if there is a positive energy surge applied to I/O pin TRXN/TRXP, then the energy dissipates from the I/O pin through diode D1 to VDD1, and then from VDD1 to ground potential (VSS) through clamp circuit 320. If there is a negative energy surge applied to I/O pin TRXN/TRXP, then the energy dissipates from the I/O pin through NMOS transistor 310 to ground potential.

Figure 4:
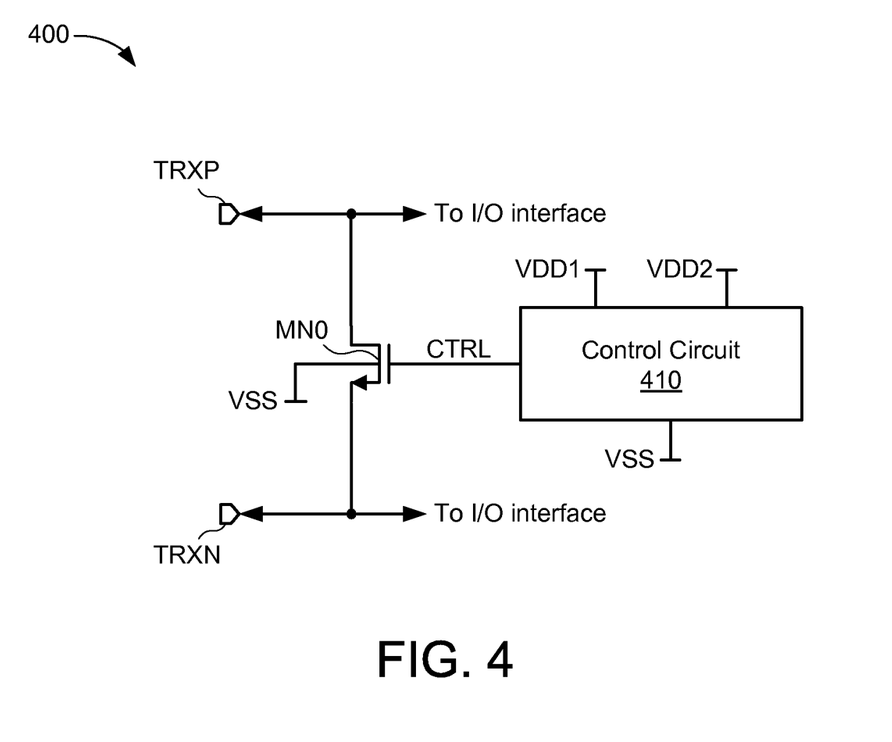
FIG. 4 is a block diagram of the differential mode protection circuit of FIG. 2 in accordance with some embodiments.

FIG. 4 is a differential mode protection circuit 400 that is one embodiment of the differential mode protection circuit 220 of FIG. 2. Differential mode protection circuit 400 includes an NMOS protection transistor MN0 and a control circuit 410. Transistor MN0 is connected between I/O pins TRXP and TRXN (e.g., the drain of transistor MN0 is connected to the TRXP pin, and the source of transistor MN0 is connected to the TRXN pin), and has a gate to receive a control signal (CTRL) from an output of control circuit 410. For some embodiments, the body of transistor MN0 is connected to VSS, as depicted in FIG. 4.

Control circuit 410 includes a first power terminal coupled to VDD1, a second power terminal coupled to VDD2, a third power terminal coupled to VSS, and an output to generate CTRL in response to a comparison between the voltage levels on VDD1 and VDD2. During normal operating conditions in which VDD1 is less than VDD2 (e.g., where VDD1=2.5v and VDD2=3.3v are both at their intended operating voltages), control circuit 410 de-asserts CTRL to a logic low state, which maintains protection transistor MN0 in a non-conductive state and thereby isolates I/O pins TRXP and TRXN from each other.

However, if a significant differential voltage appears between I/O pins TRXP and TRXN (e.g., resulting from a differential mode energy surge or an ESD event), control circuit 410 asserts CTRL to a logic high state, which turns on protection transistor MN0 and thereby connects (e.g., shorts) I/O pins TRXP and TRXN together. As used herein, the term "significant differential voltage" refers to a differential voltage that is sufficiently greater than some predetermined threshold level associated with normal differential signaling voltages to cause the operating voltage of VDD1 to rapidly spike to a level that is greater than the operating voltage level of VDD2 or to cause the voltage level of one of I/O pins TRXP or TRXN to rapidly decrease and become more negative than VSS (ground potential). During such differential energy surges, one of I/O pins TRXN/TRXP is typically driven to a high positive voltage and the other of I/O pins TRXN/TRXP is typically driven to a high negative voltage.

More specifically, if the voltage level of one of the I/O pins TRXP or TRXN rapidly increases to a more positive voltage because of a differential mode energy surge (or ESD event), then diode D1 of common-mode protection circuit 300 of FIG. 3, which is connected between that I/O pin and VDD1, may behave as a short circuit and undesirably charge VDD1 to a higher voltage than its normal operating voltage level. If this undesirable charging of VDD1 causes the voltage level of VDD1 to become greater than the voltage level of VDD2, then control circuit 410 detects this "positive surge" and turns on protection transistor MN0 to short the I/O pins TRXP and TRXN together. Shorting the differential I/O pins TRXP and TRXN together with protection transistor MN0 reduces the impedance between pins TRXP and TRXN (e.g., to a minimal impedance), which in turn allows the undesirable energy surge to be quickly dissipated to the other I/O pin rather than undesirably charging VDD1 to a more positive voltage level via diode D1. In this manner, differential mode protection circuit 400 prevents such positive surges from damaging device 200's internal circuitry (e.g., I/O interface 230 and/or core circuitry 240).

Thus, for example, if pin TRXP is rapidly charged to a more positive voltage because of the differential mode energy surge, then shorting pin TRXP to pin TRXN via protection transistor MN0 causes the positive surge on pin TRXP to safely dissipate to the other pin TRXN rather than charging pin TRXP to a level that causes diode D1 to short and undesirably charge VDD1 to a voltage greater than VDD2. Similarly, if pin TRXN is rapidly charged to a more positive voltage because of the differential mode energy surge, then shorting pin TRXN to pin TRXP via protection transistor MN0 causes the positive surge on pin TRXN to safely dissipate to the other pin TRXP rather than charging pin TRXN to a level that causes diode D1 to short and undesirably charge VDD1 to a voltage greater than VDD2.

Conversely, if the voltage level of one of the I/O pins TRXP or TRXN rapidly decreases to a more negative voltage because of a differential mode energy surge (or ESD event), then diode D1 of common-mode protection circuit 300 of FIG. 3 may become reverse biased and undesirably lower the operating voltage level of VDD1. Thus, if the voltage of the I/O pin becomes more negative than ground potential (VSS), then control circuit 410 detects this "negative surge" and turns on protection transistor MN0 to short the I/O pins TRXP and TRXN together. Shorting the differential I/O pins TRXP and TRXN together with protection transistor MN0 reduces the impedance between pins TRXP and TRXN (e.g., to a minimal impedance), which in turn allows the undesirable energy surge to be quickly dissipated to the other I/O pin.

Thus, for example, if the voltage level of pin TRXP rapidly decreases to a more negative voltage than ground potential because of the negative surge, then shorting pin TRXP to pin TRXN via protection transistor MN0 causes the negative surge on pin TRXP to safely dissipate to the other pin TRXN rather than decreasing the voltage of pin TRXP to a level that is more negative than ground potential. Similarly, if the voltage level of pin TRXN rapidly decreases to a more negative voltage than ground potential because of the negative surge, then shorting pin TRXN to pin TRXP via protection transistor MN0 causes the negative surge on pin TRXN to safely dissipate to the other pin TRXP rather than decreasing the voltage of pin TRXN to a level that is more negative than ground potential.

Figure 5A:
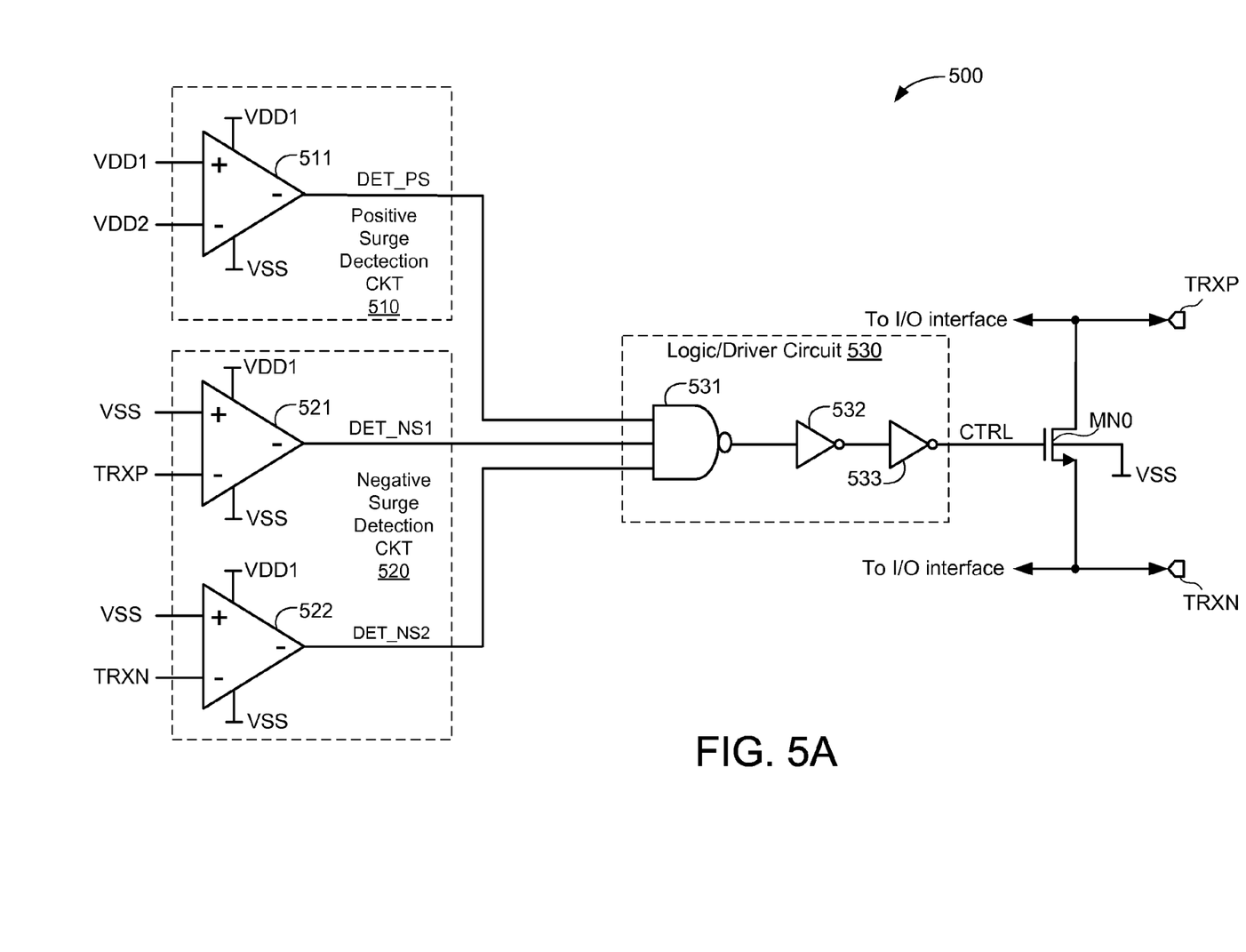
FIG. 5A is a more detailed block diagram of one embodiment of the differential mode protection circuit of FIG. 4.

FIG. 5A is a more detailed block diagram of a control circuit 500 that is one embodiment of the control circuit 410 of FIG. 4. Control circuit 500 includes a positive surge detection circuit 510, a negative surge detection circuit 520, a logic/driver circuit 530, and the NMOS protection transistor MN0. In accordance with the present embodiments, positive surge detection circuit 510 selectively causes logic/driver circuit 530 to turn on protection transistor MN0 and connect I/O pins TRXP and TRXN together in response to detection of a positive surge on either of I/O pins TRXP/TRXN, and negative surge detection circuit 520 selectively causes logic/driver circuit 530 to turn on protection transistor MN0 and connect I/O pins TRXP and TRXN together in response to detection of a negative surge on either of I/O pins TRXP/TRXN. Thus, because a differential energy surge typically drives one of I/O pins TRXN/TRXP to a high positive voltage and drives the other of I/O pins TRXN/TRXP to a high negative voltage, the present embodiments can quickly detect such differential energy surges by using separate surge detection circuits 510 and 520 to detect positive surges on one I/O pin and to detect negative surges on the other I/O pin, respectively. In this manner, the present embodiments can quickly trigger activation of the NMOS protection transistor MN0 when either a positive surge and/or a negative surge is detected.

More specifically, positive surge detection circuit 510 includes a comparator 511 having a positive input coupled to VDD1, a negative input coupled to VDD2, power terminals coupled to VDD1 and VSS, and an output to generate a positive surge detection signal DET_PS indicating whether VDD1 has become greater than VDD2. For example, when VDD1 and VDD2 are both operating at their intended supply voltage levels (e.g., such that VDD2 is greater than VDD1), then comparator 511 drives DET_PS to a logic high level. Conversely, if VDD1 becomes more positive than VDD2 because of a positive surge on one of I/O pins TRXP or TRXN, then comparator 511 drives DET_PS to a logic low level to indicate detection of a positive surge on one of the I/O pins TRXP/TRXN.

Negative surge detection circuit 520 includes a first comparator 521 and a second comparator 522. First comparator 521 detects whether a negative surge has affected I/O pin TRXP, and second comparator 522 detects whether a negative surge has affected I/O pin TRXN. More specifically, first comparator 521 has a positive input coupled to VSS, a negative input coupled to TRXP, power terminals coupled to VDD1 and VSS, and an output to generate a first negative surge detection signal DET_NS1 indicating whether the voltage on TRXP has become more negative than VSS. For example, when the voltage level of TRXP is greater than VSS (e.g., in the absence of a negative surge on pin TRXP), comparator 521 drives DET_NS1 to a logic high level. Conversely, if the voltage level of TRXP becomes more negative than VSS, then comparator 521 drives DET_NS1 to a logic low level to indicate detection of a negative surge on I/O pin TRXP.

Second comparator 522 has a positive input coupled to VSS, a negative input coupled to TRXN, power terminals coupled to VDD1 and VSS, and an output to generate a second negative surge detection signal DET_NS2 indicating whether the voltage on TRXN has become more negative than VSS. For example, when the voltage level of TRXN is greater than VSS (e.g., in the absence of a negative surge on pin TRXN), comparator 522 drives DET_NS2 to a logic high level. Conversely, if the voltage level of TRXN becomes more negative than VSS, then comparator 522 drives DET_NS2 to a logic low level to indicate detection of a negative surge on I/O pin TRXN.

The logic/driver circuit 530 includes a NAND gate 531 and two inverters 532-533. NAND gate 531 includes a first input to receive DET_PS from the output of comparator 511, a second input to receive DET_NS1 from the output of comparator 521, a third input to receive DET_NS2 from the output of comparator 522, and an output coupled to an input of inverter 532. Inverters 532-533, which may be any CMOS inverter circuits or driver circuits suitable for driving the gate of protection transistor MN0, are connected in series between NAND gate 531 and the gate of protection transistor MN0.

In operation, NAND gate 531 logically combines detection signals DET_PS, DET_NS1, and DET_NS2 to generate the control signal (CTRL), which in turn is driven to the gate of NMOS protection transistor MN0 by inverters 532-533. Thus, if all of detection signals DET_PS, DET_NS1, and DET_NS2 are driven to logic high, which indicates that neither a positive surge nor a negative surge condition has been detected, then NAND gate 531 drives CTRL to logic low, which in turn maintains protection transistor MN0 in a non-conductive state to isolate I/O pins TRXP and TRXN from each other. Conversely, if one or more of detection signals DET_PS, DET_NS1, and DET_NS2 are driven to logic low, which indicates that a positive surge and/or a negative surge condition has been detected, then NAND gate 531 drives CTRL to logic high, which turns on protection transistor MN0. Once conductive, protection transistor MN0 connects I/O pins TRXP and TRXN together to prevent damage to the internal circuitry and components of device 200, for example, by allowing the surge energy on one I/O pin to be safely dissipated to the other I/O pin.

Figure 5B:
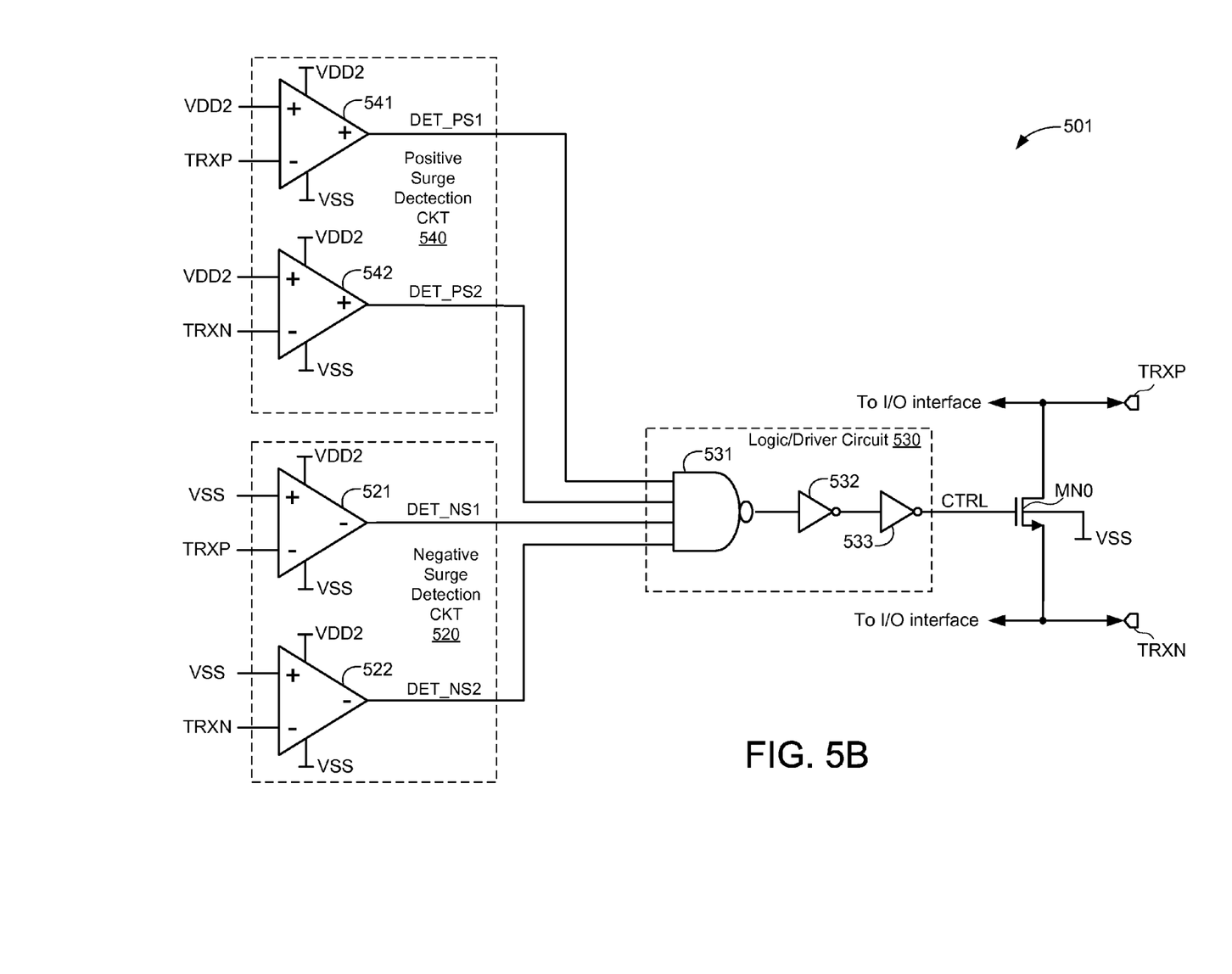
FIG. 5B is a more detailed block diagram of another embodiment of the differential mode protection circuit of FIG. 4.

For other embodiments, device 200 may not have a separate supply voltage VDD1, but instead use only the supply voltage VDD2. For such embodiments, the positive surge detection circuit 510 of FIG. 5A may be modified to include two comparators that separately determine whether the voltage of each of I/O pins TRXP and TRXN has become more positive than VDD2. For example, FIG. 5B shows a control circuit 501 that is another embodiment of the control circuit 410 of FIG. 4. Control circuit 501 is similar to control circuit 500 of FIG. 5A, except that its positive surge detection circuit 540 includes first and second comparators 541 and 542 that compare VDD2 with the TRXP pin voltage and the TRXN pin voltage, respectively, and the power terminals of all comparators 541-542 and 521-522 are coupled to VDD2.

More specifically, positive surge detection circuit 540 includes a first comparator 541 that detects whether a positive surge has affected I/O pin TRXP, and includes a second comparator 542 that detects whether a positive surge has affected I/O pin TRXN. Comparator 541 has a positive input coupled to VDD2, a negative input coupled to TRXP, power terminals coupled to VDD2 and VSS, and an output to generate a first positive surge detection signal DET_PS1 indicating whether the voltage on TRXP has become more positive than VDD2. For example, when the voltage level of TRXP is not greater than VDD2 (e.g., in the absence of a positive surge on pin TRXP), comparator 541 drives DET_PS1 to a logic high level. Conversely, if the voltage level of TRXP becomes more positive than VDD2, then comparator 541 drives DET_PS1 to a logic low level to indicate detection of a positive surge on I/O pin TRXP.

Comparator 542 has a positive input coupled to VDD2, a negative input coupled to TRXN, power terminals coupled to VDD2 and VSS, and an output to generate a second positive surge detection signal DET_PS2 indicating whether the voltage on TRXN has become more positive than VDD2. For example, when the voltage level of TRXN is not greater than VDD2 (e.g., in the absence of a positive surge on pin TRXN), comparator 542 drives DET_PS2 to a logic high level. Conversely, if the voltage level of TRXN becomes more positive than VDD2, then comparator 542 drives DET_PS2 to a logic low level to indicate detection of a positive surge on I/O pin TRXN.

The NAND gate 531 of FIG. 5B includes inputs to receive DET_PS1 from the output of comparator 541, to receive DET_PS2 from the output of comparator 542, to receive DET_NS1 from the output of comparator 521, and to receive DET_NS2 from the output of comparator 522, and an output coupled to an input of inverter 532. In operation, NAND gate 531 logically combines detection signals DET_PS1, DET_PS2, DET_NS1, and DET_NS2 to generate the control signal (CTRL), which in turn is driven to the gate of NMOS protection transistor MN0 by inverters 532-533. Thus, if all of detection signals DET_PS1, DET_PS2, DET_NS1, and DET_NS2 are driven to logic high, which indicates that neither a positive surge nor a negative surge condition has been detected, then NAND gate 531 drives CTRL to logic low, which in turn maintains protection transistor MN0 in a non-conductive state to isolate I/O pins TRXP and TRXN from each other. Conversely, if one or more of detection signals DET_PS1, DET_PS2, DET_NS1, and DET_NS2 are driven to logic low, which indicates that a positive surge and/or a negative surge condition has been detected, then NAND gate 531 drives CTRL to logic high, which turns on protection transistor MN0. Once conductive, protection transistor MN0 connects I/O pins TRXP and TRXN together to prevent damage to the internal circuitry and components of device 200.

Figure 6:
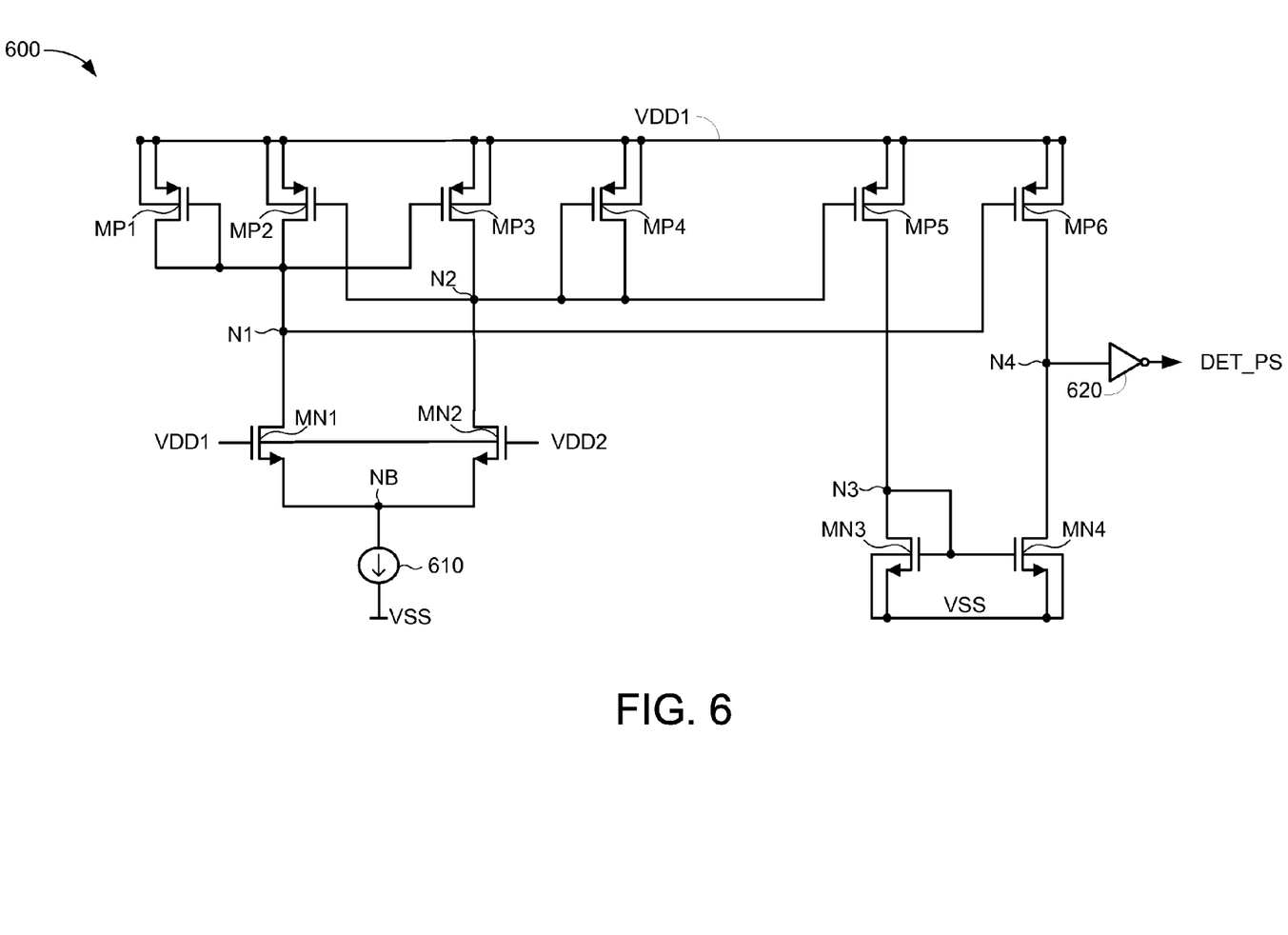
FIG. 6 is a circuit diagram of one embodiment of the positive surge detection circuit of FIG. 5A.

FIG. 6 is a differential amplifier circuit 600 that is one embodiment of the comparator 511 of positive surge detection circuit 510 of FIG. 5A. Circuit 600, which generates a single-ended output signal DET_PS in response to the differential voltage between VDD1 and VDD2, is shown to include NMOS transistors MN1-MN4, PMOS transistors MP1-MP6, a current source 610, and an inverter 620. NMOS transistors MN1-MN2 form a differential pair biased at a bias node NB by a bias current provided by current source 610. Transistor MN1 is connected between nodes N1 and NB, and has a gate coupled to VDD1. Transistor MN2 is connected between nodes N2 and NB, and has a gate coupled to VDD2. Transistor MP2 is connected between VDD1 and node N1, and has a gate coupled to node N2, while transistor MP3 is connected between VDD1 and node N2, and has a gate coupled to node N1. Transistor MP1 is a diode-connected transistor coupled between VDD1 and node N1, and transistor MP4 is a diode-connected transistor coupled between VDD1 and node N2. Transistor MP5 is connected between VDD1 and node N3, and has a gate coupled to node N2, while transistor MP6 is connected between VDD1 and node N4, and has a gate coupled to node N1. Transistors MN3 and MN4, which together form a current mirror, have gates coupled to node N3.

As mentioned above, circuit 600 compares the voltage levels of VDD1 and VDD2, and in response thereto selectively drives output signal DET_PS to either a logic high state or to a logic low state. For example, during normal operating conditions in which VDD1 is less than VDD2 (e.g., where VDD1=2.5 v and VDD2=3.3 v are both at their intended operating voltages), circuit 600 drives DET_PS to a logic high state to indicate there is no positive surge upon either of I/O pins TRXP or TRXN. Conversely, if the voltage level of VDD1 becomes greater than the voltage level of VDD2, then circuit 600 drives DET_PS to a logic low state to indicate that a positive surge upon one of I/O pins TRXP or TRXN has been detected.

More specifically, during normal operating conditions in which VDD2 is greater than VDD1, transistor MN2 turns on and transistor MN1 turns off, thereby allowing transistor MN2 to conduct most (if not all) of the bias current provided by current source 610. As a result, transistor MN2 pulls node N2 low towards ground potential. As the voltage on node N2 falls below VDD1−Vtp (e.g., where Vtp is the threshold voltage of PMOS transistor MP2), transistor MP2 turns on and pulls the voltage on node N1 high towards VDD1. The resulting high voltage on node N1 maintains transistor MP3 in a non-conductive state, thereby isolating node N2 from VDD1 and allowing node N2 to continue discharging low towards ground potential through transistor MN2. The resulting logic low state of node N2 turns on transistor MP5, while the resulting logic high state of node N1 turns off transistor MP6. Once conductive, transistor MP5 pulls node N3 high towards VDD1, thereby causing transistors MN3 and MN4 to turn on. More specifically, transistor MN4 mirrors the current conducted by transistor MP5, thereby pulling output node N4 low towards ground potential. The non-conductive transistor MP6 isolates output node N4 from VDD1. In response to the logic low state of node N4, the inverter 620 (which may be any suitable CMOS inverter or buffer circuit) drives output signal DET_PS to a logic high state to indicate the absence of any positive energy surge on either of I/O pins TRXP and TRXN.

Conversely, if the voltage level of VDD1 increases to a level greater than VDD2 (e.g., because of a positive energy surge appearing at either of I/O pins TRXP or TRXN), transistor MN1 turns on and transistor MN2 turns off, thereby allowing transistor MN1 to conduct most (if not all) of the bias current provided by current source 610. As a result, transistor MN1 pulls node N1 low towards ground potential. As the voltage on node N1 falls below VDD1−Vtp (e.g., where Vtp is the threshold voltage of PMOS transistor MP3), transistor MP3 turns on and pulls the voltage on node N2 high towards VDD1. The resulting high voltage on node N2 maintains transistor MP2 in a non-conductive state, thereby isolating node N1 from VDD1 and allowing node N1 to continue discharging low towards ground potential through transistor MN1. The resulting logic low state of node N1 turns on transistor MP6, while the resulting logic high state of node N2 turns off transistor MP5. Once transistor MP5 turns off, the current minor transistors MN3 and MN4 also turn off. More specifically, the non-conductive transistor MN4 isolates output node N4 from ground potential, thereby allowing the conductive transistor MP6 to more quickly pull output node N4 high towards VDD1. In response to the resulting logic high state of node N4, inverter 620 drives output signal DET_PS to a logic low state to indicate that a positive energy surge has been detected on one of the I/O pins TRXP/TRXN.

Note that the cross-coupled PMOS transistors MP2 and MP3 provide some hysteresis for the differential amplifier circuit 600 (e.g., to prevent short-duration transients from inadvertently triggering switching operations of the differential pair MN1 and MN2), and diode-connected transistors MP1 and MP4 limit the hysteresis effect to increase speed of circuit 600.

Figure 7A:
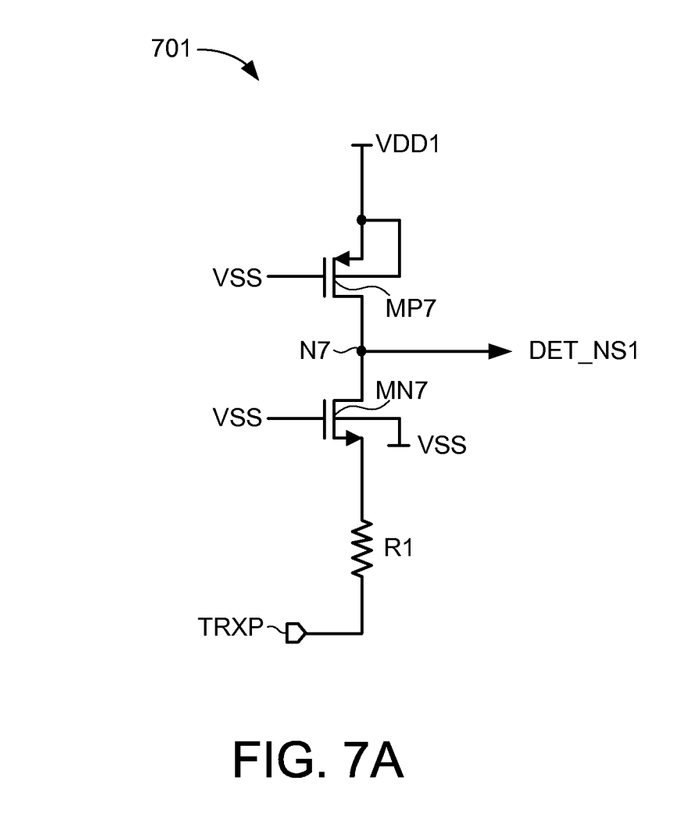
FIGS. 7A-7B are circuit diagrams of exemplary embodiments of the negative surge detection circuit of FIG. 5A.

FIG. 7A is a comparator circuit 701 that is one embodiment of comparator circuit 521 of FIG. 5A. Comparator circuit 701 includes a PMOS transistor MP7, an NMOS transistor MN7, and a resistor R1. PMOS transistor MP7 is coupled between VDD1 and output node N7, and has a gate coupled to VSS (ground potential). NMOS transistor MN7 and resistor R1 are connected in series between node N7 and I/O pin TRXP, with transistor MN7 having a gate coupled to VSS. Note that the commonly-coupled drains of transistors MP7 and MN7 form output node N7, and that the resistor R1 protects NMOS transistor MN7 from surge energy appearing at I/O pin TRXP. For some embodiments, resistor R1 has a resistance of approximately 200 ohms.

Further, for some embodiments, PMOS transistor MP7 is a relatively weak pull-up transistor, and NMOS transistor MN7 is a relatively strong pull-down transistor. For one embodiment, PMOS transistor MP7 has an effective channel width of approximately 0.5 microns and an effective channel length of approximately 4 microns, while NMOS transistor MN7 has an effective channel width of approximately 8 microns and an effective channel length of approximately 2 microns.

In operation, if the voltage level of TRXP is greater (e.g., more positive) than VSS, then the source of NMOS transistor MN7 is higher than the gate of NMOS transistor MN7 (e.g., Vgs<Vtn), which causes transistor MN7 to turn off and isolate node N7 from I/O pin TRXP. Because the gate voltage of PMOS transistor MP7 is at VSS and the source of PMOS transistor MP7 is at VDD1, PMOS transistor MP7 turns on and pulls output node N7 high towards VDD to indicate the absence of a negative surge on pin TRXP.

Conversely, if the voltage level of TRXP becomes more negative than VSS by Vtn, then the source of NMOS transistor MN7 is lower (more negative) than the gate of NMOS transistor MN7 (e.g., Vgs>Vtn), which causes transistor MN7 to turn on and pull node N7 low towards the more negative voltage level on I/O pin TRXP. The resulting logic low state of output node N7 indicates detection of a negative surge on I/O pin TRXP.

Figure 7B:
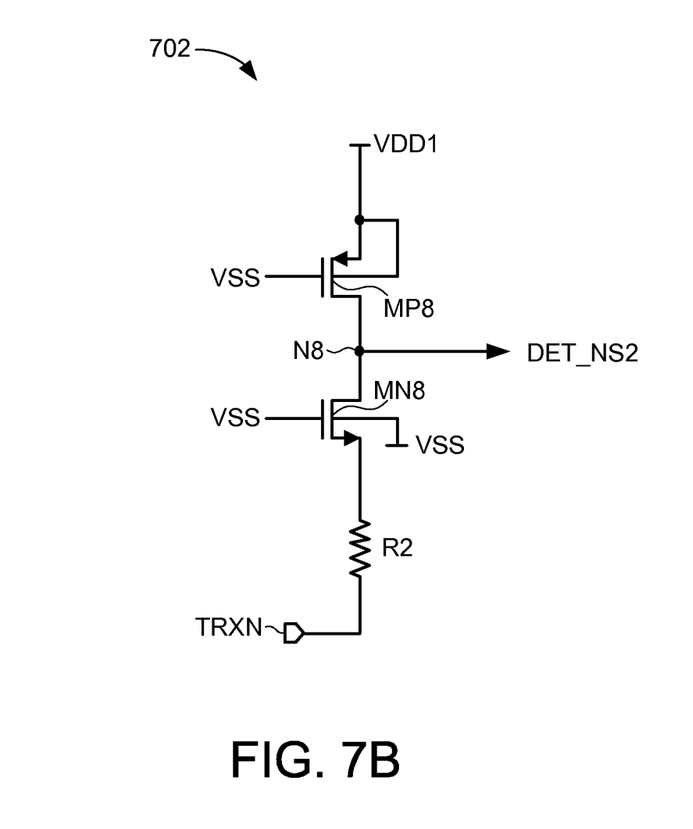

FIG. 7B is a comparator circuit 702 that is one embodiment of comparator circuit 522 of FIG. 5A. Comparator circuit 702 includes a PMOS transistor MP8, an NMOS transistor MN8, and a resistor R2. PMOS transistor MP8 is coupled between VDD1 and output node N8, and has a gate coupled to VSS (ground potential). NMOS transistor MN8 and resistor R2 are connected in series between node N8 and I/O pin TRXN, with transistor MN8 having a gate coupled to VSS. Note that the commonly-coupled drains of transistors MP8 and MN8 form output node N8, and that the resistor R2 protects NMOS transistor MN8 from surge energy appearing at I/O pin TRXN. For some embodiments, resistor R2 has a resistance of approximately 200 ohms.

Further, for some embodiments, PMOS transistor MP8 is a relatively weak pull-up transistor, and NMOS transistor MN8 is a relatively strong pull-down transistor. For one embodiment, PMOS transistor MP8 has an effective channel width of approximately 0.5 microns and an effective channel length of approximately 4 microns, while NMOS transistor MN8 has an effective channel width of approximately 8 microns and an effective channel length of approximately 2 microns.

In operation, if the voltage level of TRXN is greater (e.g., more positive) than VSS, then the source of NMOS transistor MN8 is higher than the gate of NMOS transistor MN8 (e.g., Vgs<Vtn), which causes transistor MN8 to turn off and isolate node N8 from I/O pin TRXN. Because the gate voltage of PMOS transistor MP8 is at VSS and the source of PMOS transistor MP8 is at VDD1, PMOS transistor MP8 turns on and pulls output node N8 high towards VDD to indicate the absence of a negative surge on pin TRXN.

Conversely, if the voltage level of TRXN becomes more negative than VSS by Vtn, then the source of NMOS transistor MN8 is lower (more negative) than the gate of NMOS transistor MN8 (e.g., Vgs>Vtn), which causes transistor MN8 to turn on and pull node N8 low towards the more negative voltage level on I/O pin TRXN. The resulting logic low state of output node N8 indicates detection of a negative surge on I/O pin TRXN.

Figure 8:
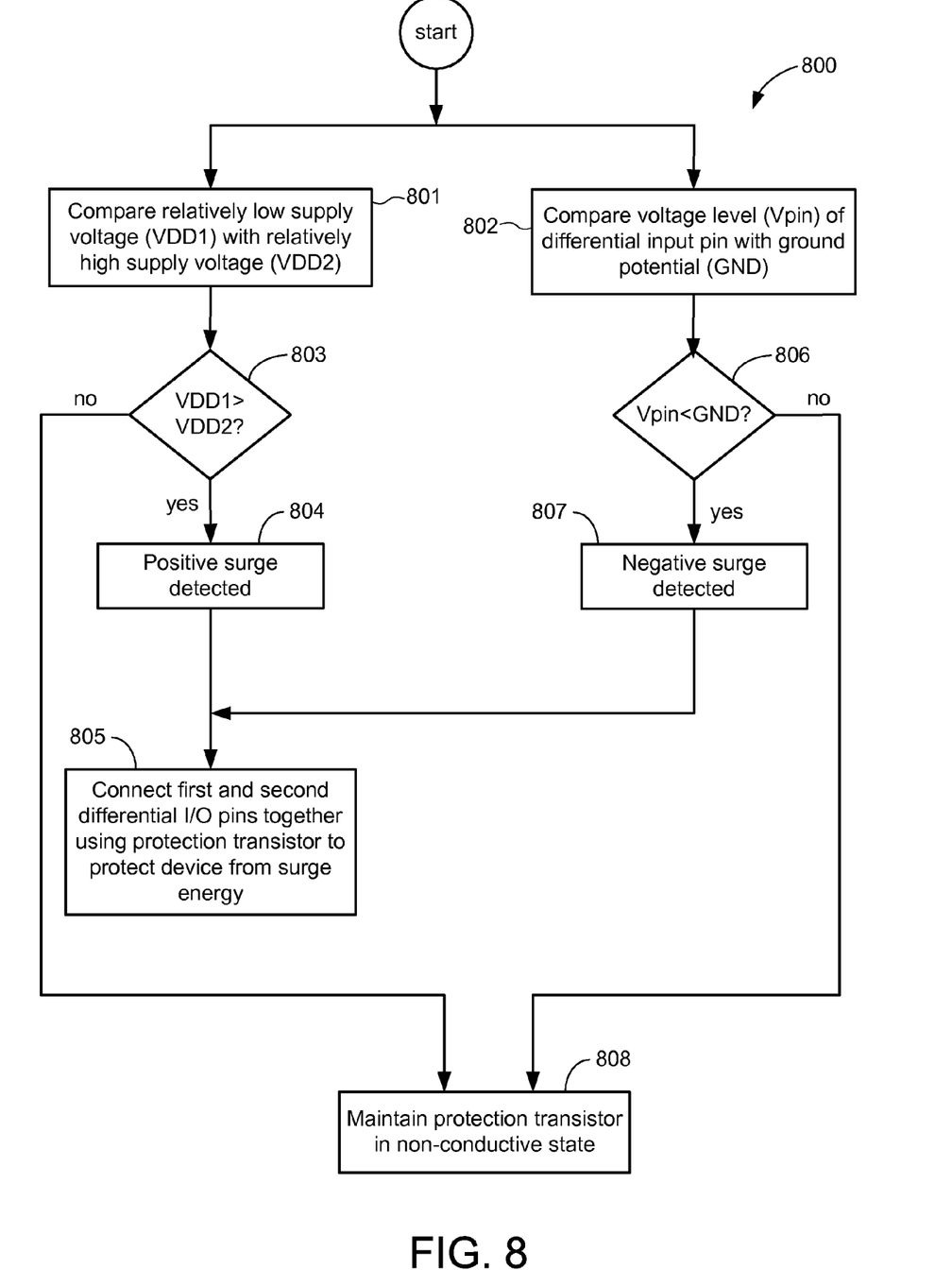
FIG. 8 is an illustrative flow chart depicting an exemplary operation for selectively shorting together the differential I/O pins of the device of FIG. 2 in accordance with some embodiments.

FIG. 8 is an illustrative flow chart 800 depicting an exemplary operation for selectively shorting together the differential I/O pins TRXP and TRXN of device 200 of FIG. 2 in accordance with some embodiments. Referring also to FIG. 5A, comparator 511 of positive surge detection circuit 510 compares the voltage level of VDD1 with the voltage level of VDD2 (801), and concurrently the negative surge detection circuit 520 compares the voltage level of VSS with the I/O pins TRXP and TRXN (802). More specifically, comparator 521 of negative surge detection circuit 520 compares the voltage level of VSS with the voltage level of I/O pin TRXP, and comparator 522 of negative surge detection circuit 520 compares the voltage level of VSS with the voltage level of I/O pin TRXN.

If VDD1>VDD2, as tested at 803, then a positive energy surge is detected (804), and control circuit 500 turns on the protection transistor MN0 to connect (e.g., short) I/O pins TRXP and TRXN together (805). In this manner, any positive energy surge on one I/O pin is dissipated to the other I/O pin instead of undesirably charging VDD1 to an even higher voltage level. Alternately, for embodiments in which device 200 uses VDD2 but not VDD1, then positive surge detection circuit 540 of FIG. 5B compares VDD2 with the pin voltages of TRXP and TRXN. If the pin voltage of either TRXP or TRXN has become more positive than VDD2, then control circuit 501 turns on the protection transistor MN0 to connect I/O pins TRXP and TRXN together (805). Otherwise, control circuit 501 maintains the protection transistor MN0 in a non-conductive state.

If the voltage (Vpin) of either I/O pin TRXP or TRXN has become more negative than ground potential or VSS, as tested at 806, then a negative surge energy is detected (807), and control circuit 500 turns on the protection transistor MN0 to connect (e.g., short) I/O pins TRXP and TRXN together (805). In this manner, any negative energy surge on one I/O pin is dissipated to the other I/O pin.

However, if VDD1≤VDD2, as tested at 803, and if the voltage of either I/O pin is not less than ground potential, as tested at 806, then control circuit 500 maintains the protection transistor MN0 in a non-conductive state to isolate I/O pins TRXP and TRXN from each other (808).

In the foregoing specification, the present embodiments have been described with reference to specific examples. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense. For example, method steps depicted in the flow chart of FIG. 8 can be performed in other suitable orders and/or one or more methods steps may be omitted.

The present embodiments can be provided as a computer program product, or software, that may include a non-transitory machine-readable medium having stored thereon instructions. The machine-readable medium may be used to program a computer system (or other electronic devices) to implement the present embodiments. The machine-readable medium may include, but is not limited to, floppy diskettes, optical disks, CD-ROMs, and magneto-optical disks, ROMs, RAMs, EPROMs, EEPROMs, magnet or optical cards, flash memory, or other type of media/machine-readable medium suitable for storing electronic instructions.

The invention claimed is:

1. An integrated circuit device having first and second differential input/output (I/O) pins and having a surge protection circuit, wherein the surge protection circuit comprises:
    a protection transistor connected between the first and second differential I/O pins and having a gate to receive a control signal;
        a positive surge detection circuit having a first input coupled to a first supply voltage, a second input coupled to a second supply voltage that is greater than the first supply voltage, and an output;
        a negative surge detection circuit having a first input coupled to ground potential, a second input coupled to the first differential I/O pin, and an output; and
        a combinational logic gate having a first input coupled to the output of the positive surge detection circuit, a second input coupled to the output of the negative surge detection circuit, and an output to generate the control signal.

2. The device of claim 1, wherein the positive surge detection circuit is to selectively cause assertion of the control signal in response to a comparison between the first and second supply voltages, and wherein the negative surge detection circuit is to selectively cause assertion of the control signal in response to a comparison between a voltage level of the first differential I/O pin and ground potential.

3. The device of claim 1, wherein the logic gate turns on the protection transistor to connect the first and second differential I/O pins together if the first supply voltage becomes greater than the second supply voltage or if the voltage level of the first differential I/O pin becomes more negative than ground potential.

4. The device of claim 1, wherein the positive surge detection circuit comprises a single-ended differential amplifier having a first input to receive the first supply voltage, a second input to receive the second supply voltage, and an output to selectively assert the control signal.

5. The device of claim 1, wherein the negative surge detection circuit comprises:
    a PMOS transistor coupled between the first supply voltage and the output of the negative surge detection circuit, and having a gate coupled to ground potential;
    an NMOS transistor coupled between the output of the negative surge detection circuit and a first node, and having a gate coupled to ground potential; and
    a resistor coupled between the first node and the first differential I/O pin.

6. The device of claim 1, further comprising a common-mode protection circuit, having terminals coupled to the first and second differential I/O pins, to discharge common-mode voltage spikes on a respective differential I/O pin to ground potential.

7. The device of claim 6, wherein the common-mode protection circuit comprises:
    a diode coupled between the respective differential I/O pin and the first supply voltage;
    a grounded-gate transistor coupled between the respective differential I/O pin and ground potential; and
    a clamp circuit coupled between the second power pin and ground potential.

8. An integrated circuit device, comprising:
    first and second differential input/output (I/O) pins to exchange a differential signal with an external communication medium;
    a first power pin to receive a relatively low supply voltage;
    a second power pin to receive a relatively high supply voltage; and a surge protection circuit, comprising:
a common-mode protection circuit, having terminals coupled to the first and second differential I/O pins, to discharge common-mode voltage spikes on the differential I/O pins to ground potential; and
a differential mode protection circuit, having terminals coupled to the first and second differential I/O pins, to selectively connect the first and second differential I/O pins together in response to differential voltage spikes on the differential I/O pins.

9. The device of claim 8, wherein the differential protection circuit comprises:
a protection transistor connected between the first and second differential I/O pins and having a gate to receive a control signal; and a control circuit to generate the control signal in response to a comparison between voltage levels on the first and second power pins.

10. The device of claim 9, wherein the control circuit turns on the protection transistor to short the first and second differential I/O pins together if the relatively low supply voltage becomes greater than the relatively high supply voltage.

11. The device of claim 8, wherein the differential mode protection circuit comprises:
a protection transistor connected between the first and second differential I/O pins and having a gate to receive a control signal;
a positive surge detection circuit to selectively assert the control signal in response to a comparison between voltage levels on the first and second power pins; and
a negative surge detection circuit to selectively assert the control signal in response to a comparison between a voltage level on the first differential I/O pin and ground potential.

12. The device of claim 11, wherein the differential mode protection circuit further comprises:
a combinational logic gate having a first input coupled to an output of the positive surge detection circuit, a second input coupled to an output of the negative surge detection circuit, and an output to generate the control signal.

13. The device of claim 11, wherein the positive surge detection circuit comprises a single-ended differential amplifier having a first input to receive the relatively low supply voltage, a second input to receive the relatively high supply voltage, and an output to selectively assert the control signal.

14. The device of claim 11, wherein the negative surge detection circuit comprises:
a PMOS transistor coupled between the first power pin and the output of the negative surge detection circuit, and having a gate coupled to ground potential;
an NMOS transistor coupled between the output of the negative surge detection circuit and a first node, and having a gate coupled to ground potential; and a resistor coupled between the first node and the first differential I/O pin.

15. The device of claim 8, wherein the common-mode protection circuit further comprises:
a diode coupled between the first differential I/O pin and the first power pin;
a grounded-gate transistor coupled between the respective differential I/O pin and ground potential; and
a clamp circuit coupled between the first power pin and ground potential.

16. A method for protecting an integrated circuit device having first and second differential input/output (I/O) pins from positive and negative energy surges, the device including a first power pin to receive a relatively low supply voltage and including a second power pin to receive a relatively high supply voltage, wherein the method comprises:
comparing the relatively low supply voltage and the relatively high supply voltage in a first compare circuit to generate a positive surge detection signal;
comparing a voltage level of the first differential I/O pin with ground potential in a second compare circuit to generate a negative surge detection signal;
if the positive surge detection signal indicates that the relatively low supply voltage has become greater than the relatively high supply voltage, shorting the first and second differential I/O pins together; and
if the negative surge detection signal indicates that the voltage level of the first differential I/O pin has become more negative than ground potential, shorting the first and second differential I/O pins together.

17. The method of claim 16, wherein the shorting further comprises:
logically combining the positive and negative surge detection signals in a combinational logic gate to generate a control signal; and
driving a gate of a protection transistor connected between the first and second differential I/O pins with the control signal.

18. The method of claim 17, wherein the control signal is asserted to turn on the protection transistor if the relatively low supply voltage has become greater than the relatively high supply voltage or if the voltage level of the first differential I/O pin has become more negative than ground potential.

19. The method of claim 17, wherein the first compare circuit comprises a single-ended differential amplifier having a first input to receive the relatively low supply voltage, a second input to receive the relatively high supply voltage, and an output to selectively assert the control signal.

20. The method of claim 16, wherein the second compare circuit comprises:
a PMOS transistor coupled between the relatively low supply voltage and an output of the second compare circuit, and having a gate coupled to ground potential;
an NMOS transistor coupled between the output of the second compare circuit and a first node, and having a gate coupled to ground potential; and
a resistor coupled between the first node and the first differential I/O pin.

21. An integrated circuit device having first and second differential input/output (I/O) pins and having a surge protection circuit, wherein the surge protection circuit comprises:
a protection transistor connected between the first and second differential I/O pins and having a gate to receive a control signal;
a positive surge detection circuit having a first input coupled to a supply voltage, a second input coupled to the first differential I/O pin, and an output;
a negative surge detection circuit having a first input coupled to ground potential, a second input coupled to the first differential I/O pin, and an output; and
a combinational logic gate having a first input coupled to the output of the positive surge detection circuit, a second input coupled to the output of the negative surge detection circuit, and an output to generate the control signal.

22. The device of claim 21, wherein the positive surge detection circuit is to selectively cause assertion of the control signal in response to a comparison between the supply voltage and a voltage level of the first differential I/O pin, and wherein the negative surge detection circuit is to selectively cause assertion of the control signal in response to a comparison between the voltage level of the first differential I/O pin and ground potential.

23. The device of claim 21, wherein the logic gate turns on the protection transistor to connect the first and second differential I/O pins together if the voltage level of the first differential I/O pin becomes more positive than the supply voltage or if the voltage level of the first differential I/O pin becomes more negative than ground potential.

* * * * *